(12) United States Patent
Pastrick et al.

(10) Patent No.: US 9,092,995 B2
(45) Date of Patent: Jul. 28, 2015

(54) MEDICAL TRAINING DEVICE

(75) Inventors: John J Pastrick, University Hts., OH (US); Christopher E Bryniarski, South Euclid, OH (US); Mark E Cook, Stow, OH (US); Timothy E Lint, North Royalton, OH (US)

(73) Assignee: Prestan Products LLC, Mayfield Village, OH (US)

( * ) Notice: Subject to any disclaimer, the term of this patent is extended or adjusted under 35 U.S.C. 154(b) by 1406 days.

(21) Appl. No.: 11/469,645

(22) Filed: Sep. 1, 2006

(65) Prior Publication Data

US 2007/0054254 A1 Mar. 8, 2007

Related U.S. Application Data

(60) Provisional application No. 60/713,276, filed on Sep. 1, 2005.

(51) Int. Cl.
 *G09B 23/28* (2006.01)
 *G09B 23/30* (2006.01)

(52) U.S. Cl.
 CPC .............. *G09B 23/28* (2013.01); *G09B 23/30* (2013.01)

(58) Field of Classification Search
 USPC ................................................ 434/262, 265
 See application file for complete search history.

(56) References Cited

U.S. PATENT DOCUMENTS

| | | |
|---|---|---|
| 2,947,470 A | 8/1960 | Ruben |
| 2,966,929 A | 1/1961 | Brown |
| 3,049,811 A | 8/1962 | Ruben |
| 3,209,469 A | 10/1965 | James |
| 3,276,147 A | 10/1966 | Padellford |
| 3,369,411 A | 2/1968 | Hines |
| 3,556,122 A | 1/1971 | Laerdal |
| 3,562,924 A | 2/1971 | Baermann et al. |
| 3,562,925 A | 2/1971 | Baermann et al. |
| 3,568,333 A | 3/1971 | Clark |
| 3,665,919 A | 5/1972 | Laerdal |
| 3,689,945 A | 9/1972 | Laerdal |
| 3,736,362 A | 5/1973 | Laerdal |
| 3,859,737 A | 1/1975 | Laerdal |
| 3,872,609 A | 3/1975 | Smrcka |
| 3,874,093 A | 4/1975 | Garbe |
| 3,916,535 A | 11/1975 | Hewson |
| 3,994,075 A | 11/1976 | Kohnke |

(Continued)

OTHER PUBLICATIONS

Worldpoint ECC, Inc., BLS Manikins, 2006 catalog pp. 26-28, Worldpoint ECC, Inc., Wheeling, IL, US.

*Primary Examiner* — Sam Yao
*Assistant Examiner* — Evan Page

(57) ABSTRACT

A medical training device with an improved clam shell type torso arrangement. An improved two-piece tiltable head feature, including mechanical mounting structure for secure attachment of an improved lung bag or face shield. The head also includes an improved nose feature to provide a more realistic representation of nasal cartilage, and an improved neck assembly. Additionally, an electro-mechanical indicator device is provided to show real time feedback of the CPR compression rate being administered by a student on the training manikin of the present application. The feedback by the device may be provided preferably by visual indicators, but may also have, or alternatively have, audio indicators or signals, such as words or sounds, to indicate whether or not the student is compressing within the preferred rate range, and/or the degree of variance in the student's compression sequences.

10 Claims, 9 Drawing Sheets

(56) References Cited

U.S. PATENT DOCUMENTS

| | | | |
|---|---|---|---|
| 4,001,950 | A | 1/1977 | Blumensaadt |
| 4,019,501 | A | 4/1977 | Harris |
| 4,062,357 | A | 12/1977 | Laerdal |
| 4,092,788 | A | 6/1978 | Gowing |
| 4,095,590 | A | 6/1978 | Harrigan |
| 4,331,426 | A | 5/1982 | Sweeney |
| 4,611,998 | A | 9/1986 | Ramamurthy |
| 4,801,268 | A | 1/1989 | Kohnke |
| 4,828,501 | A * | 5/1989 | Ingenito et al. ............... 434/265 |
| 4,915,635 | A | 4/1990 | Ingenito et al. |
| 4,932,879 | A | 6/1990 | Ingenito et al. |
| 4,984,987 | A | 1/1991 | Brault et al. |
| 5,055,052 | A | 10/1991 | Johnsen |
| 5,083,559 | A | 1/1992 | Brault et al. |
| 5,195,896 | A | 3/1993 | Sweeny et al. |
| 5,238,409 | A | 8/1993 | Brault et al. |
| 5,249,968 | A | 10/1993 | Brault et al. |
| 5,256,070 | A | 10/1993 | Garth et al. |
| 5,286,206 | A | 2/1994 | Epstein et al. |
| 5,295,835 | A | 3/1994 | Scheinberg et al. |
| 5,312,259 | A | 5/1994 | Flynn |
| 5,330,514 | A | 7/1994 | Egelandsdal et al. |
| 5,383,786 | A | 1/1995 | Kohnke |
| 5,423,685 | A | 6/1995 | Adamson et al. |
| 5,468,151 | A | 11/1995 | Egelandsdal et al. |
| 5,540,592 | A | 7/1996 | Scheinberg |
| 5,580,255 | A | 12/1996 | Flynn |
| 5,593,306 | A | 1/1997 | Kohnke |
| 5,628,633 | A | 5/1997 | Lehman |
| 5,885,084 | A | 3/1999 | Pastrick et al. |
| 5,993,219 | A | 11/1999 | Bishay |
| 6,500,009 | B1 * | 12/2002 | Brault et al. .................. 434/265 |
| 2005/0214727 | A1 * | 9/2005 | Stoianovici et al. .......... 434/262 |

* cited by examiner

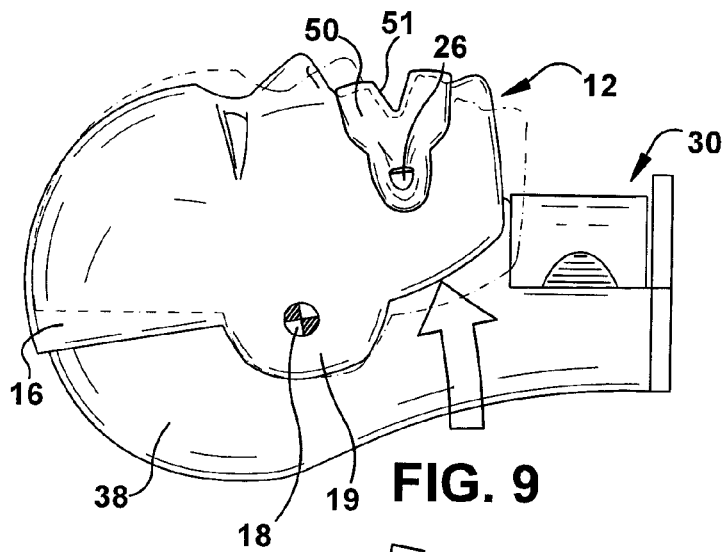
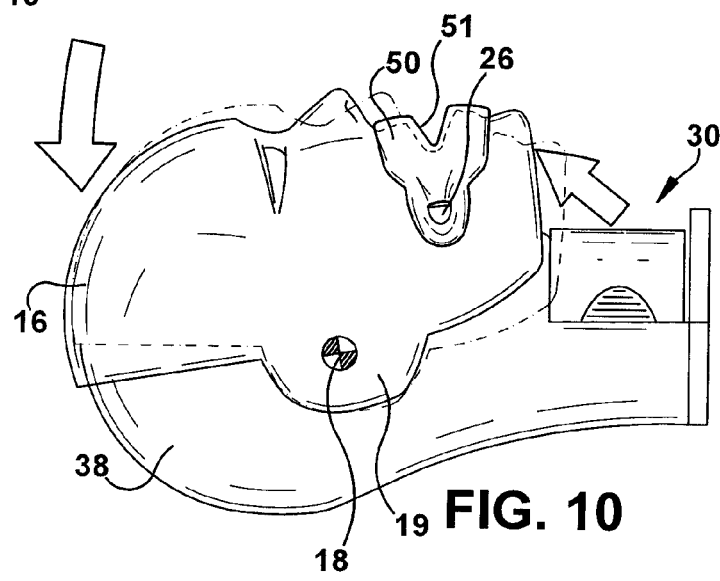
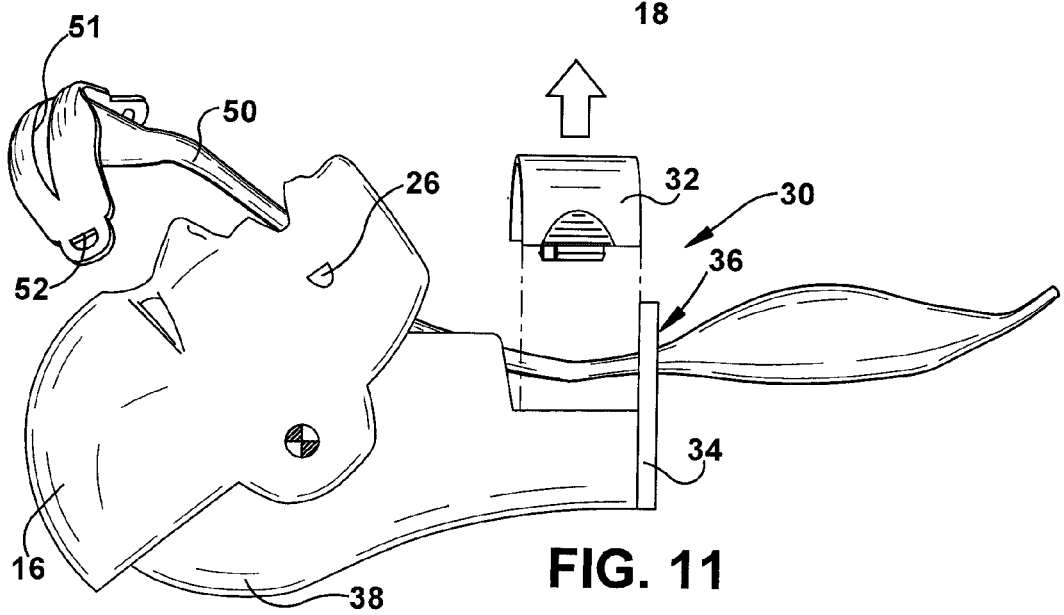

US 9,092,995 B2

MEDICAL TRAINING DEVICE

CROSS REFERENCE TO RELATED APPLICATION

The present application claims priority from U.S. Provisional Patent Application Ser. No. 60/713,276 filed Sep. 1, 2005.

FIELD OF INVENTION

The present application is directed to an improved medical training device, and more particularly to a medical training manikin having improved features and accessories.

BACKGROUND

Numerous solutions have been offered in the past to provide an inexpensive medical training manikin which can be used in a training environment for either a group of trainees or a single individual. It is desired that such medical training manikins are lightweight for easy transportation to the training site, as well as simple and quick to assemble, readily able to be cleaned or otherwise maintained in a sanitary condition, easy to use, and capable of substantially simulating the functions and responses of a human patient.

Prior art devices which have attempted to provide solutions to the above include U.S. Pat. Nos. 6,500,009, 5,330,514, 5,468,151, 4,984,987 and 5,885,084.

SUMMARY OF THE INVENTION

The present medical training device provides a number of improved features over prior products. The present product has an improved clam shell type torso arrangement. An improved two-piece tiltable head feature is also provided. A head may include mechanical mounting structure for secure attachment of an improved lung bag or face shield. The head also includes an improved nose feature to provide a more realistic representation of nasal cartilage, and an improved neck assembly. Additionally, an electro-mechanical indicator device is provided to show real time feedback of the CPR compression rate being administered by a student on the training manikin of the present application. The feedback by the device may be provided preferably by visual indicators, but may also have, or alternatively have, audio indicators or signals, such as words or sounds, to indicate whether or not the student is compressing within the preferred rate range, and/or the degree of variance in the student's compression sequences. The indicator device also includes an automatic on/off sleep feature which is activated by use and non-use of the present training manikin.

DESCRIPTION OF THE DRAWINGS

FIGS. 9 and 10 are schematic side views of the improved medical training device schematically illustrating the pivoting or tilting movement of the face portion of the head to enable training of the jaw thrust technique.

FIGS. 11, 12 and 13 are schematic side and perspective illustrations of the installation of a lung bag which is secured to the face portion of the improved medical training device at posts or hooks protruding from the face portion.

DETAILED DESCRIPTION

Figure 1:
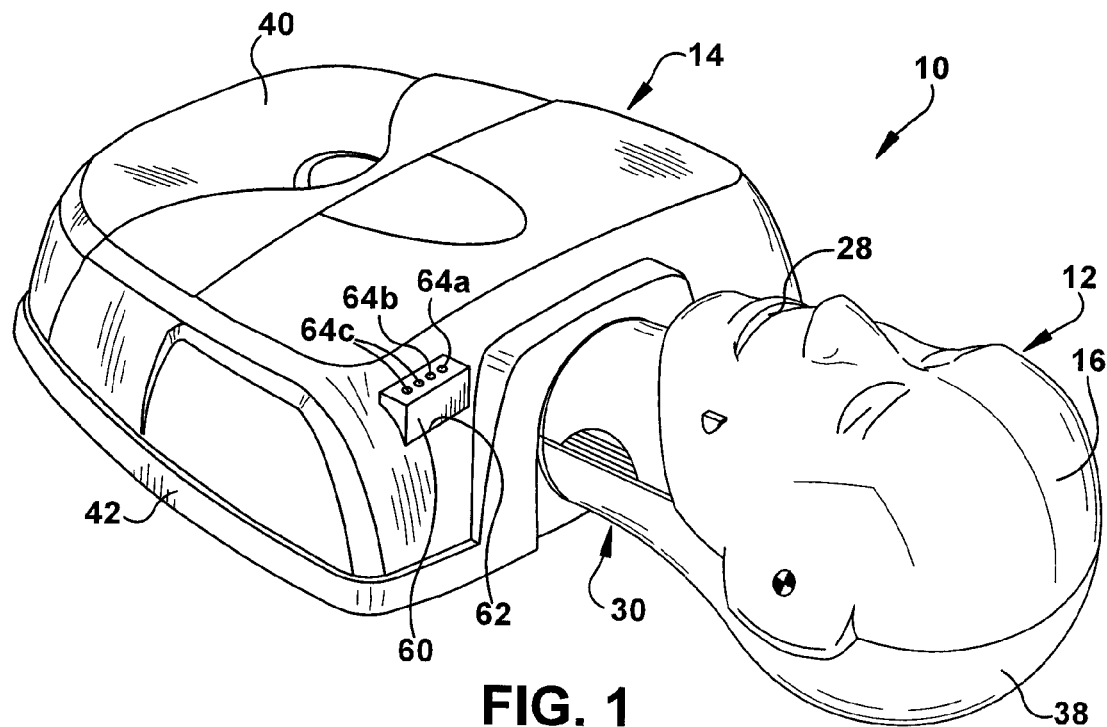
FIG. 1 is a perspective view of the improved medical training device of the present application showing a feedback indicator device.

The present application provides an improved medical training device 10. A general view of the adult embodiment of the improved medical training product or device 10 is shown in FIGS. 1 to 5, and the infant embodiment is shown generally at reference 10' in FIGS. 6 and 7. Unless otherwise indicated, many features of the adult and infant embodiments are similar and will be not be distinguished in detail, other than by the use of a prime designation in connection with the infant embodiment.

The improved device 10 includes a torso which is a two-piece clam shell style torso 14. The improved two-piece torso 14 is shown in a variety of positions in FIGS. 3 to 5. One piece of the torso 14 comprises an outer skin portion 40 made of thin pliable material, which is preferably a molded elastomeric material. In the illustrated embodiment of FIGS. 1, 3 to 5 and 7, the pliable skin material 40 is supported by a substantially rigid portion or frame 42. The rigid frame 42 is preferably manufactured of a rigid molded plastic material. The frame 42 and skin 40 may be secured together by molding the two pieces together, or may be mechanically secured together, such as by an adhesive.

Figure 6:
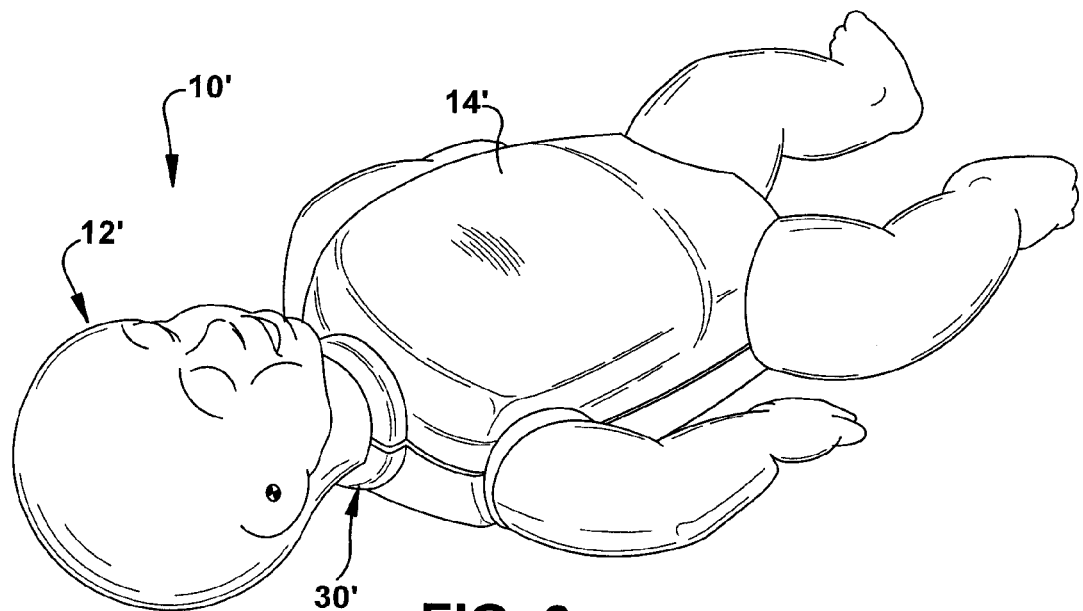
FIG. 6 is a schematic, perspective illustration of the improved medical training device in an infant embodiment.
Figure 16:
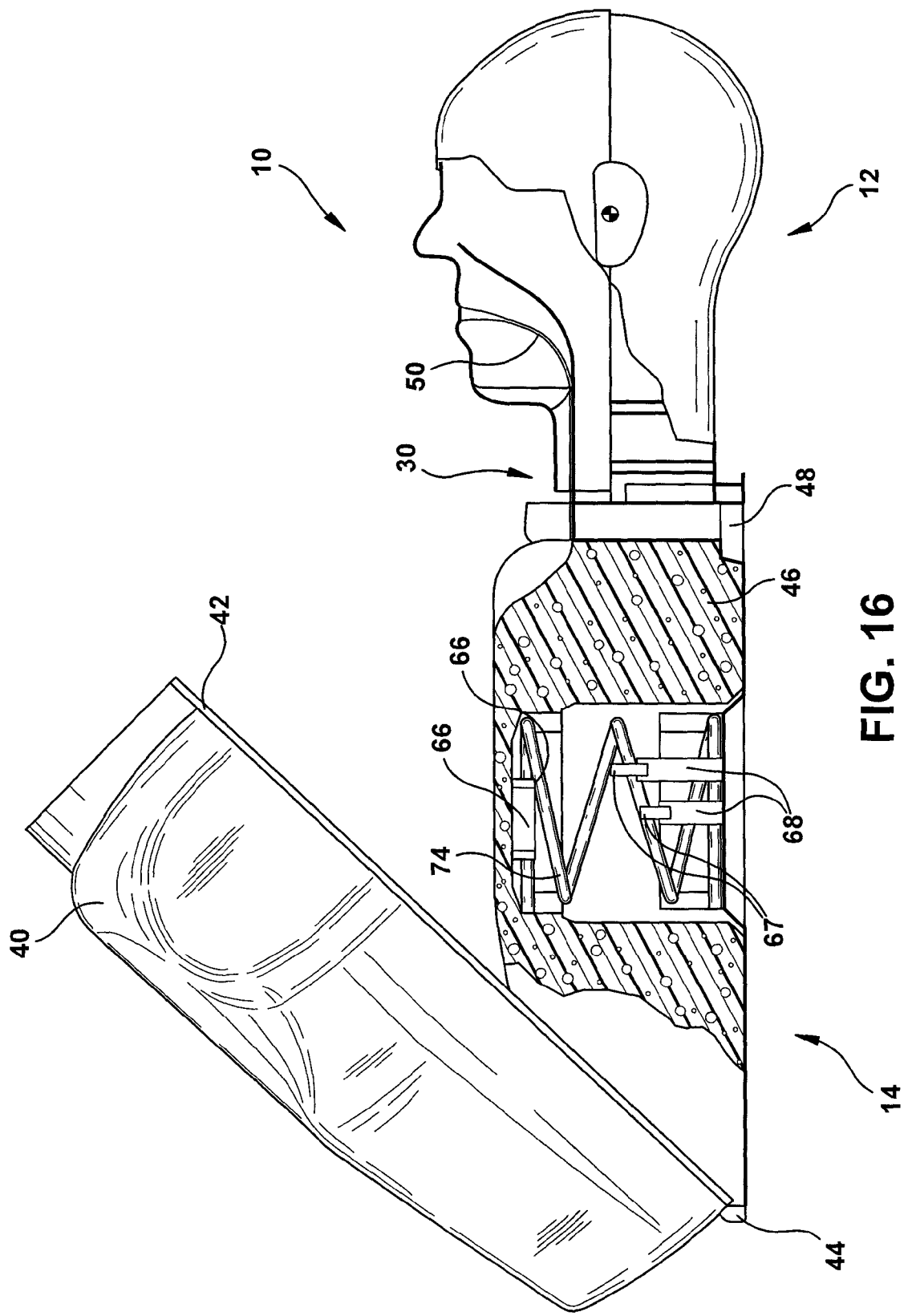
FIG. 16 is a partial side view, schematic cut-away illustrating the internal sensors, bellows and electrical contacts used in connection with the CPR compression rate indicator of the present medical training device.

The second torso piece is an inner core portion 46 which is covered by the outer pliable skin 40, as shown in FIGS. 1 and 6. The skin and core pieces of the torso 14 may be connected together at a hinge 44 located along one side of the frame 42. The core portion 46 is preferably of a compressible core material, such as a polyurethane foam material, to enable simulated CPR compressions. The second core torso piece 46 may likewise include a base frame 48 for supporting the core portion 46, which base frame 48 may be secured to the core 46 via adhesive. The frames 42, 48 may be connected together at the hinge 44 along one side of the rigid support portions or frames. As shown in FIG. 16, mechanical (such as posts 68, and a spring or bellows 74) and electrical components used to perform and measure compressions during operation of the manikin training device, are provided internally of the core 46.

Figure 7:
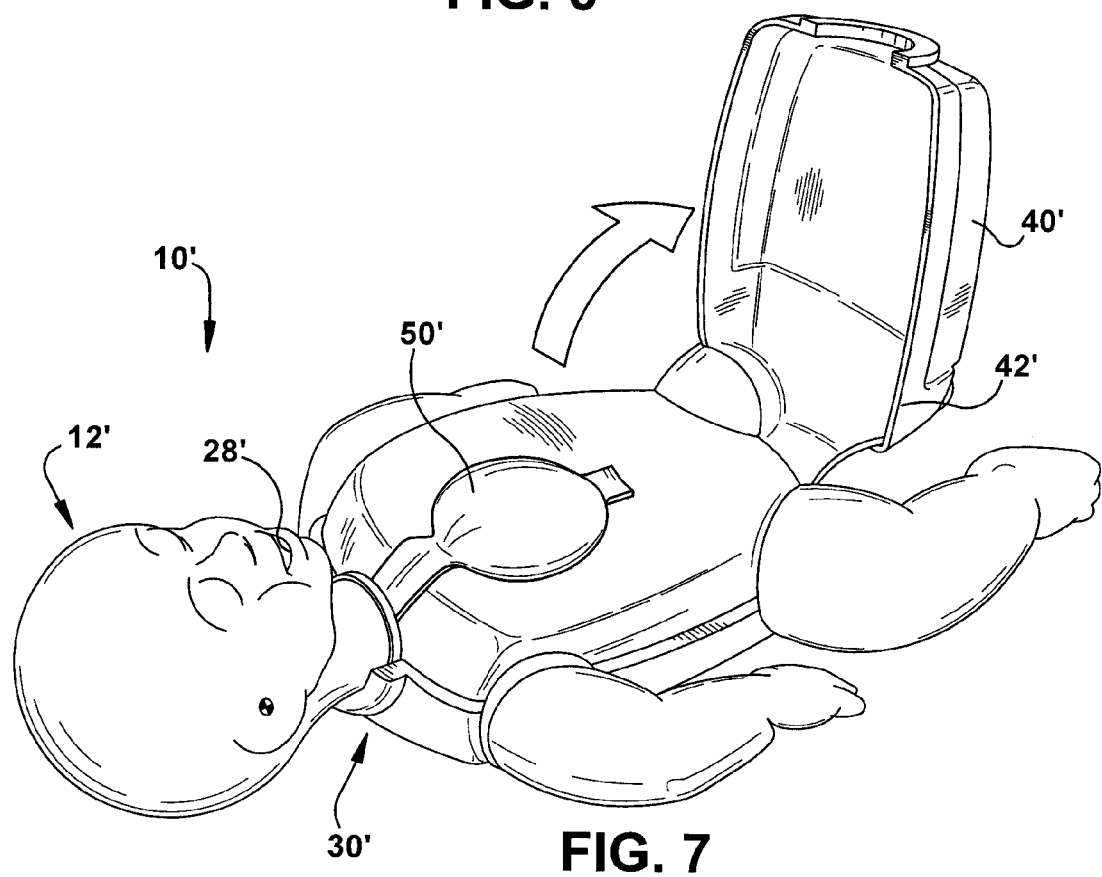
FIG. 7 is a schematic, perspective illustration of the infant embodiment of FIG. 6 with the pliable cover in an open position with respect to the torso.

The torso 14 may include a variety of additional features, such as openings for insertion of additional demonstration organs (not shown), such as for organ transplant trainings. Additional components, such as a simulated heart or lung to be compressed, are shown in FIGS. 6 and 7.

The use of a two-piece torso 14 allows for fast and easy opening and closing of outer skin 40 for quick installation of a lung bag 50 which enables simulation of lung and chest expansion, particularly through the pliable outer skin portion 40. As illustrated in the figures, the pliable outer skin portion 40 is molded to include simulated landmarks commonly found on the human torso for use during student training and CPR performance. Additionally, the torso 14 opens to capture and secure a head 12 at a neck assembly 30. The neck assembly 30 is illustrated in a position generally opposite the hinge 44. A neck assembly 30 of a variety of designs may be provided as shown in FIGS. 4-5 and 11-12.

Figure 8:
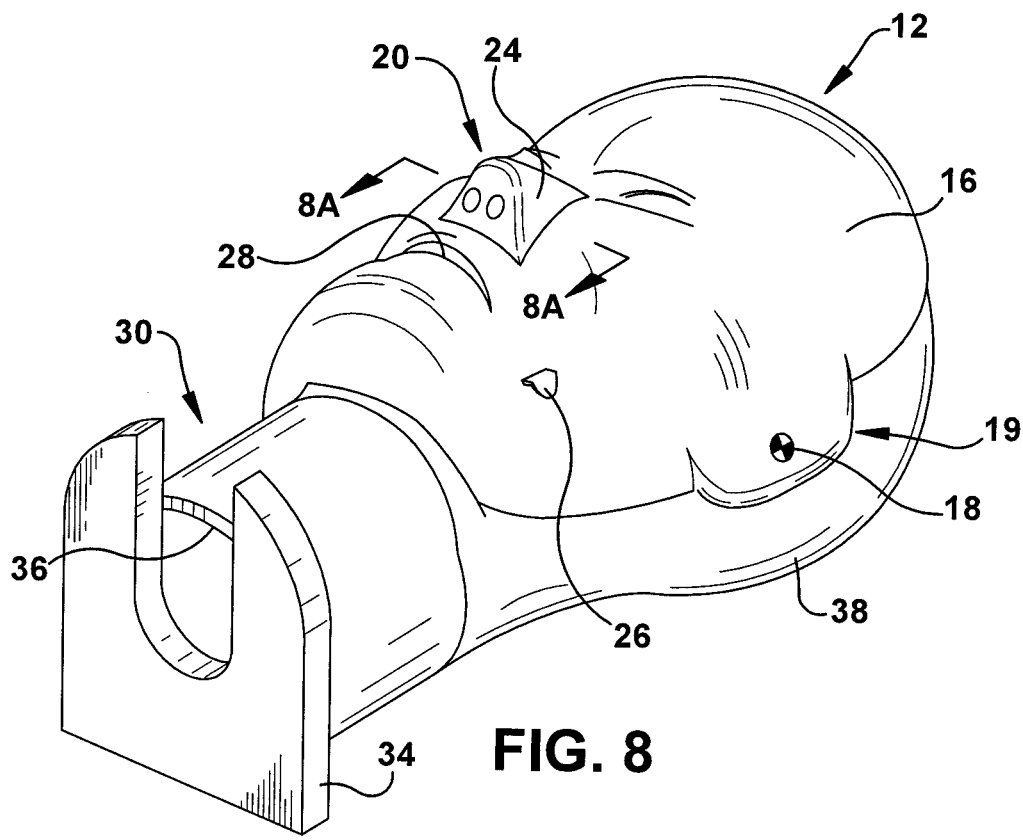
FIG. 8 is a schematic, perspective illustration of the head and neck assembly of the improved medical training device of the present application.
Figure 8A:
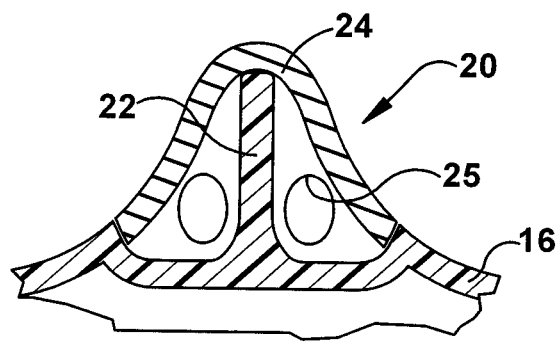
FIG. 8A is a cut-away view of an improved nose structure taken along the line 8A-8A in FIG. 8.

The improved two-piece head 12 is provided with molded head pieces, where the front half or face portion 16 is movable/tiltable, and the back half or base head portion 38 is stationary. A pliable simulated skin cover (not shown) may also be added to the face portion 16 where desired for additional cleanliness or maintenance considerations. Additionally, an improved nose simulation is also provided as best shown in FIGS. 8 and 8A. The nose includes a simulated rigid nose cartilage portion 22 with a removable pliable cover portion 24 over said simulated rigid nose cartilage 24. The nose cartilage portion 22 is formed as a part of the rigid face portion 16, with the removable cover portion 24 formed of pliable material with openings 25 simulating nostrils. The cover portion 24 is snapped into place over the nose cartilage portion 22 to simulate skin.

Pivot points 18, forming a pivot axis, are provided to interconnect the head and face portions near simulated ears 19 located on opposing sides of the base head portion 38, which is similar to the natural pivot location of the human head generally at the top of the spine. The use of pivot points 18, and a single pivot axis, near the ears 19, eliminates the need for more complex multiple piece pivot designs that are often necessitated by movement of the back of the head.

The front half or face portion 16 of the present device pivots at the pivot points 18, which define the single pivot axis, or is tilted by either a tilt of the forehead (pressing against the forehead) and lifting the chin as shown by the arrows in FIG. 10, or by a jaw line lift illustrated by the arrows in FIG. 9, which enables the training of the jaw thrust technique. In particular, the two pieces of the head may be biased by a spring or weight positioned intermediate the two pieces of the head 12 and internally. The design is preferably such that the jaw of the front or face portion 16 must be moved to a certain level or position before the forehead may be tilted back as provided by the mechanical shape of the pivot mechanism.

Figure 2:
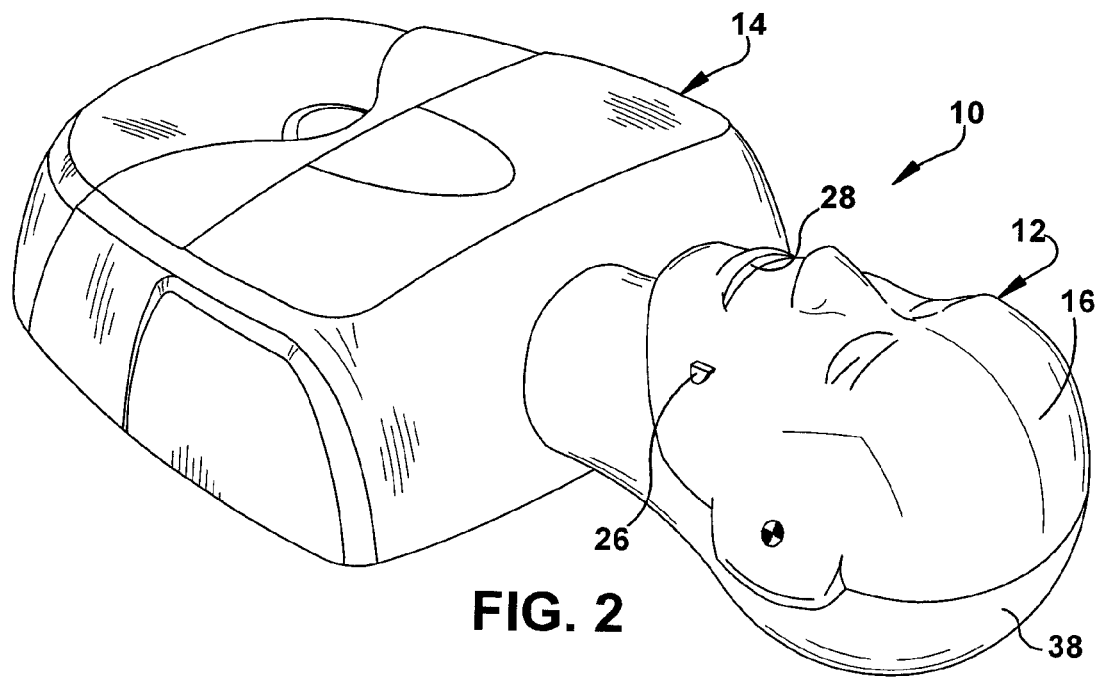
FIG. 2 is a perspective view of the improved medical training device having mechanical mounting structure on the head for securing a lung bag or face shield.

The two-piece head pieces are shown in a variety of positions in FIGS. 11 to 16. In the illustrated embodiments, a neck assembly 30 for attachment to the fixed head portion 38 is also provided. The lung bag 50 also passes through the neck assembly 30 during engagement within the head 12 and torso 14 of the improved medical training device 10. In the embodiments of FIGS. 2 and 8, the neck assembly 30 is provided integrally with the back head portion 38 such that the lung bag 50 is threaded through a mouth opening 28 in the face portion 16, through a fixed neck assembly 30 and into the torso 14 positioned intermediate the skin 40 and core portion 46, as shown in FIG. 7.

In FIGS. 3 to 5 and 9 to 14, a base portion 34 of the neck assembly 30 is provided as part of the fixed base head portion 38, and a second portion is provided as a removable slider cover 32 having finger tabs 33, which snaps into engagement with the base portion 34 of the neck assembly 30. In either embodiment, the neck assembly 30 provides an opening 36 for passage of the lung bag 50 intermediate the head 12 and torso 14.

Figure 3:
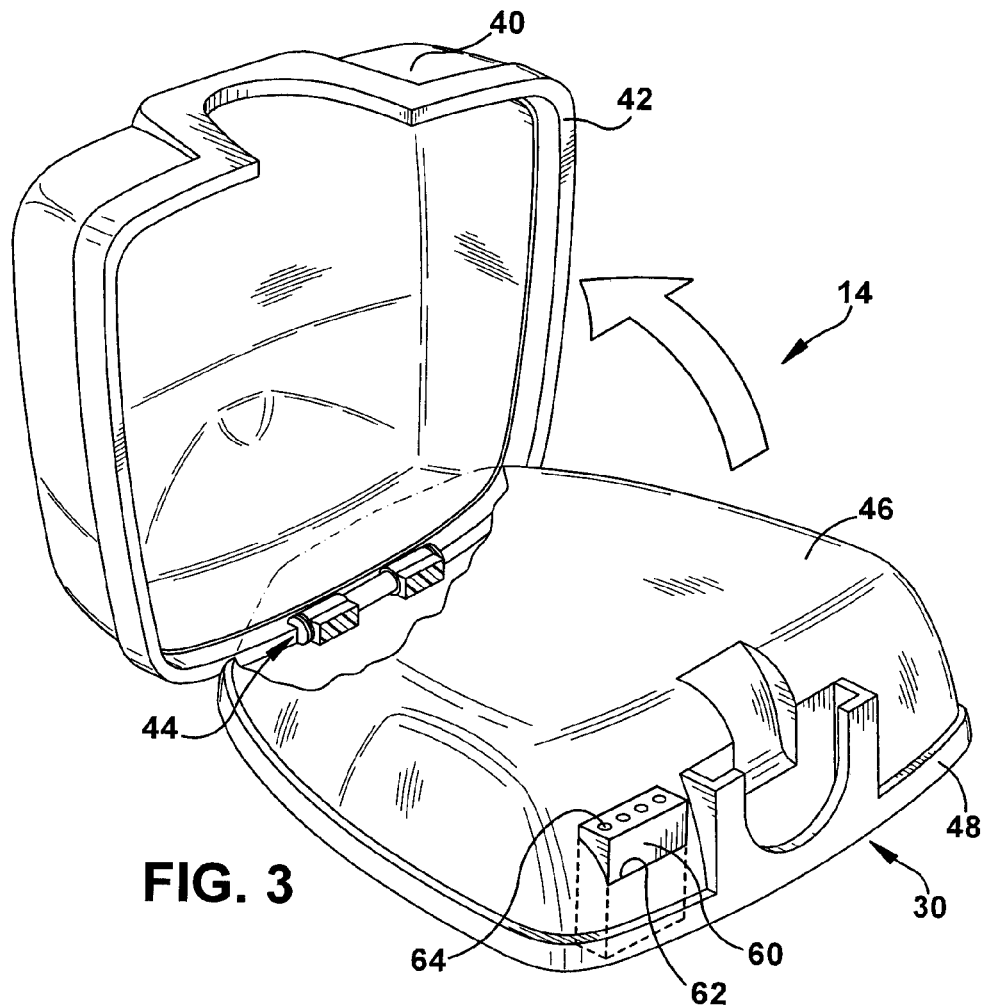
FIG. 3 is a schematic perspective view of the improved medical training device showing a two-piece clam shell style torso, where one piece is an outer skin portion made of thin pliable material supported by a substantially rigid frame, and a second piece is an inner compressible core material supporting a compression rate indicator device.
Figure 4:
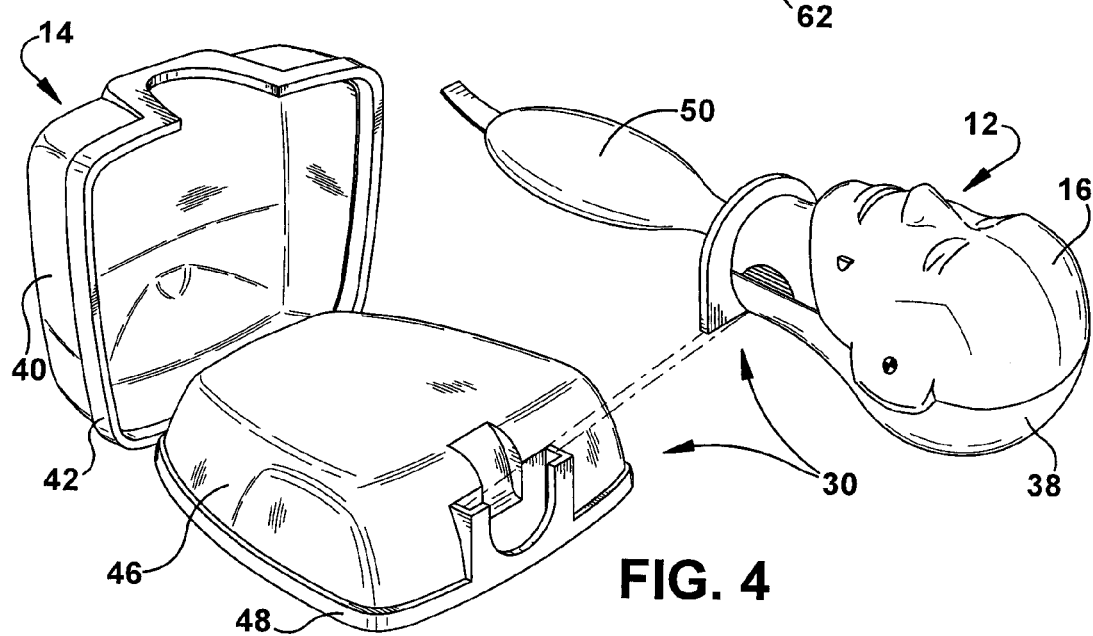
FIG. 4 illustrates a torso similar to FIG. 3, together with a schematic, perspective illustration of the head with a neck assembly and a lung bag prior to engagement with the torso.
Figure 5:
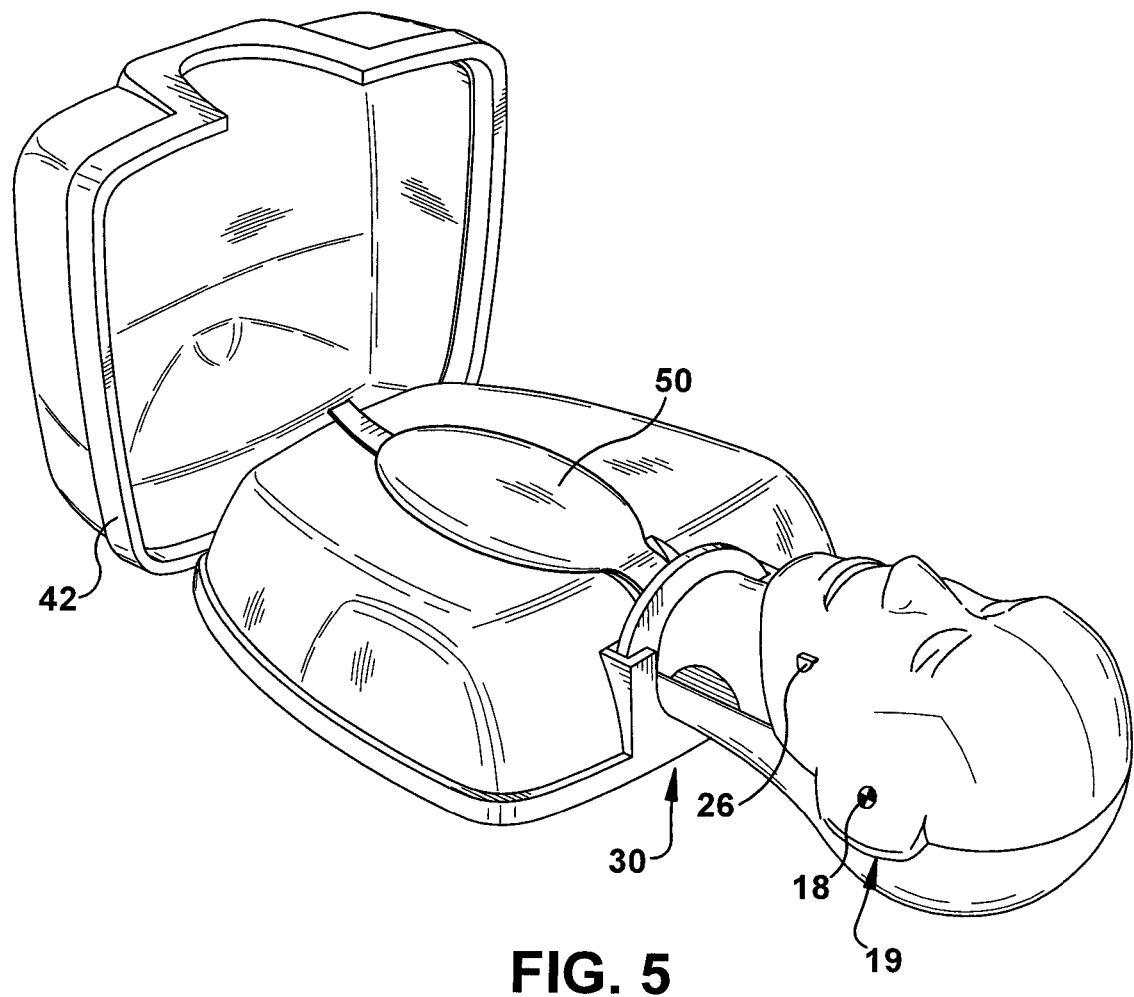
FIG. 5 illustrates the engaged torso and head of the device of FIG. 4.
Figure 12:
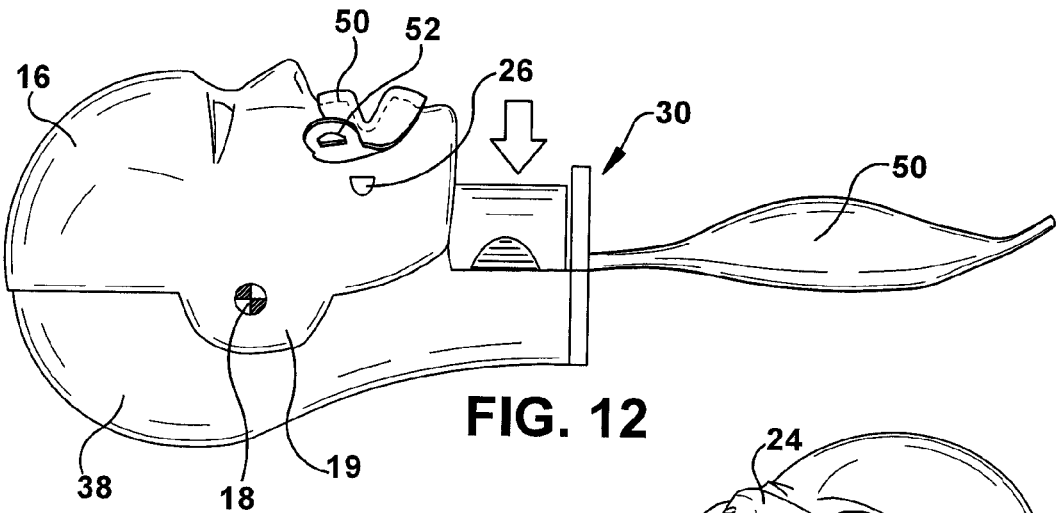
Figure 13:
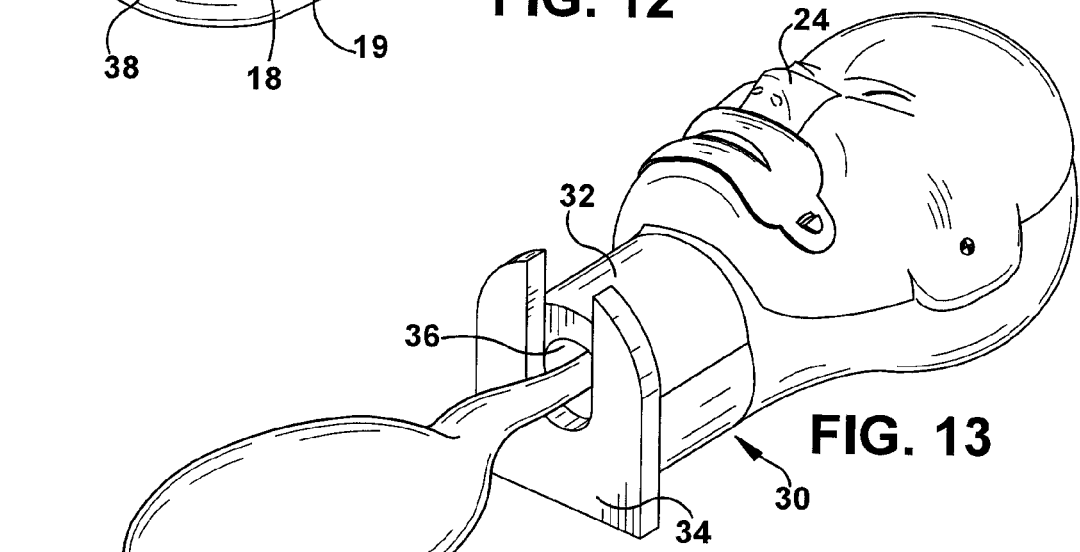
Figure 14:
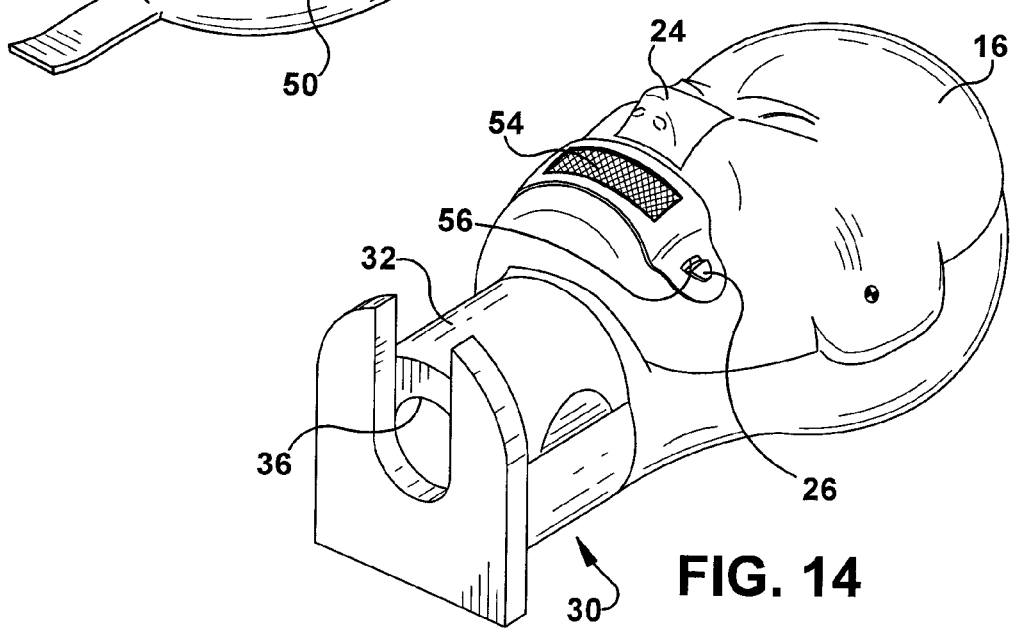
FIG. 14 schematically illustrates a face shield which is mechanically secured to the face portion of the improved medical training device, and may alternatively be secured over a lung bag.
Figure 15:
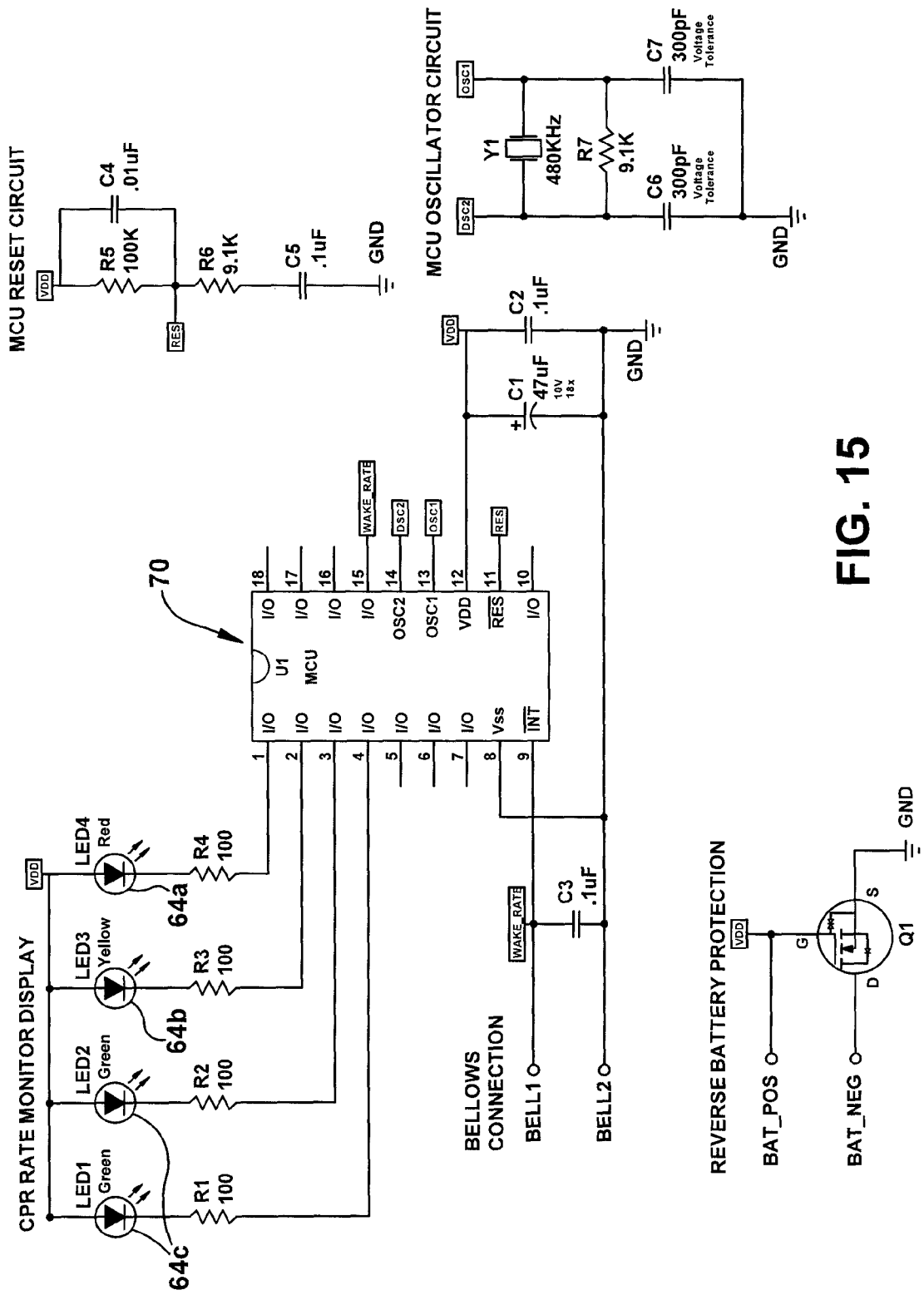
FIG. 15 schematically illustrates an electrical circuit diagram for a CPR compression rate indicator of the present medical training device.

As shown in FIGS. 11 to 13, the lung bag 50 is made of thin-film polymer material. To make use of the present device, the lung bag 50 is inserted through the mouth opening 28 of the face portion 16 of the head 14, through any neck assembly 30, and laid on the compressible core portion 46 of the torso 14 while the outer skin 40 is in an open position, as shown in FIGS. 3 to 4 and 7. The lung bag 50 is a sealed bag to be inflated for simulation of lung inflation, with a single opening formed as a mouth portion 51 of the lung bag 50. Two openings 52 provided on the lung bag at the sides of the mouth portion 51, which openings 52 are for attachment to protruding portions 26, such as posts or hooks, extending from the face portion 16 of the head 14. The lung bag 50 is secured to and held flush against the mouth area of face portion 16 by the mechanical means of the holes or cuts 52 in the thin-film lung bag material. Similar holes or cuts 56 may be provided in a face shield barrier 54 to secure the face shield 54 covering the mouth opening 28 in the face portion 16, as shown in FIG. 15, or secured over the lung bag 50 covering the mouth opening 51, such that two layers of material are mechanically secured to the face portion 15 using the protruding posts 26. With both the lung bags and face shields of the present design, the thin-film material is secured in place flush to the face portion of the manikin which improves training efficacy by reducing interference of the material, reducing the need for repositioning of the material, and improving the visual presence of the manikin during training.

Finally, the present device provides a novel CPR rate indicator 60, which is an electro-mechanical device that provides real time feedback of CPR compression rate being administered by the student on the training manikin device 10, 10'. The feedback is provided directly by visual indicators and indicates whether or not the student is compressing within the preferred compression rate range. Also, the indicator 60 may inform the student concerning what degree of variance there is in the compressions being administered. Indications may be provided as colored illuminated indicators, a numeric readout, or other visual methods. The CPR rate indicator may be provided as an add on module which is integrated within or connected to an existing manikin product so as to be visually accessible to the student while CPR is being performed. As shown in FIGS. 1 and 3, the CPR rate indicator 60 is provided integrally with the torso 14. A window or opening 62 may be provided through the skin 40 and core portion 46 to enable viewing of the indicator 60 during use of the present training device. Alternatively, the indicator 60 may be provided as an original equipment feature to the manikin product 10, 10'. Where illuminated indicators 64 are provided, they may be color coded to convey the level of student performance, e.g. red 64a is poor, for example, less than 60 compressions per minute; yellow 64b is fair, for example, less than 80 but greater than 60 compressions per minute; green 64c is acceptable, for example, less than 100 but greater than 80 compressions per minute; the illumination of both green lights 64c is a preferred performance, for example, 100 or more compressions per minute; and if desired, illumination and flashing of both green lights may be a more preferred performance rate. The indication may be provided by colored/illuminated indicators 64a-c, such as LED's, a numeric readout, or other visual method, as well as by audio signals, such as beeps or tonal sounds. Audio signals may be provided as negative sounds, more positive sounds, most positive sounds and double positive sounds, to convey the desired rate performance information. The indicator module 60 is preferably integrated within, or connected to, the manikin 10 to be visually accessible to the student while CPR is being performed on the manikin training device.

The CPR rate indicator 60 of the present application is preferably desired as a visual training feature, which is passive and, unlike audio feedback, does not interfere with the training exercise. However, it should be understood that audio feedback may have additional desirability under certain training circumstances. Additionally, the visual feedback is preferred over prior art metronome type timing devices which the student attempts to follow and match repeating audible signals that represent the desired frequency of compression. By remaining a passive feature, the visual indicators can be ignored until it is desired by the student or instructor. Further, the real time feedback regarding the compression rate performed is believed superior to other methods which record the compression rate, but the record can only be reviewed after the training exercise is completed. With the present rate indicator device 60, the student can view the visual indicators 64 while the compressions are in progress, and make concurrent adjustments and improve training performance during the exercise. Also, the CPR rate indicator 60 may be configured to respond with positive visual feedback only when both the compression rate being performed by the student and the depth of compression into the core portion 46 are properly achieved.

FIG. 15 provides a schematic illustration of the electrical circuit of the CPR rate indicator 60, which includes a conventional microprocessor unit 70 for recording and calculating the desired measurements described, the desired visual indicators 64a-c, audio indicators, controllers, such as automatic on and off controls, and a power supply. The device is battery operated, with an operating voltage range of between 2.20VDC and 5.5VDC, meaning that either 2 or 3 conventional batteries may optionally be designed for use. The indicator 60 is preferably provided as a series of LED or other lights which would be located at any position which is visible to the student during the application of compressions to the manikin, but preferably would be provided within a slot or window 62 positioned near the shoulder of the manikin device 10 as shown in FIGS. 1 and 3.

Upon approaching the present manikin device having a CPR compression rate indicator 60, the indicator may be in the off mode. Upon an initial compression such that the sensor 66 engages the electrical contacts 67, 68, the rate indicator is automatically moved to on mode of operation. During initial student compressions on the manikin device 10, 10', the visual display would only provide a red light 64a. The indicator 60 waits during the initial compressions until the student begins to perform at a regular compression speed. After a few data points are collected using sensors 66 interconnected with the indicator device 60, a real time moving average of the speed of compressions is measured and calculated by the microprocessor unit 70. Later during the compression exercise, a different number of points are collected for averaging. To collect such compression data, the electrical sensor 66 is provided as shown in FIG. 16 at the center of the manikin torso 14 with a wire contact 67 extending to the indicator module 60 for recording the number, speed and depth of compressions. The electrical sensors 66 may be provided for engagement with posts 68 supporting the wire contact 67. The posts 68 are of a specific height such that engagement of the contact with the posts by the student ensures that the desired compression depth has been achieved by the student to simulate heart compression. After the last compression is sensed by the sensor 66, a timer within the indicator 60, generally shown within the microprocessor 70 in FIG. 15, is activated which may be customized to a desired time period. After the passage of the desired time, if no compressions are sensed, the indicator 60 is automatically moved to the off or sleep mode. In sleep mode, the device draws only about 1 micro Amp (μA) of current. Thus, the use of such a novel timer and sleep mode in the indicator 60 enables the present manikin device 10, 10' to achieve longer battery life. The use of the timer is ideal in a teaching environment, since an instructor or student need not specifically turn the manikin device on or off, as the device 60 is able to wake itself up from a low power consumption sleep mode. In the illustrated preferred embodiment, the training device does not include an on/off switch.

The CPR indicator 60 must accurately display the rate of CPR compressions performed on the device 10, 10', thus a microcontroller (MCU) is preferred in the illustrated circuit of FIG. 15. Since the compression rate is a function of time, the clock source must be is accurate and a resonator is preferable over a simple resistor/capacitor network, which has very wide tolerances and in many cases is also temperature dependent. An oscillator network is connected to pins 13 and 14 of the microcontroller as shown in FIG. 15. Because there is no on/off switch in the circuit, it is technically always powered by the batteries, and low power consumption of 1 uA during sleep mode is essential. A metal-oxide semiconductor field-effect transducer or MOSFET is preferred in the current design for reverse battery protection, as in FIG. 15, since, unlike a diode, the MOSFET minimizes the voltage drop across it to maximize run time.

Once the device is in sleep mode, it is activated or reactivated when the bellows 74 is pressed at least one time. Pressing the bellows 74, closes a set of electrical contacts across the bell1 and bell2 connection points shown in FIG. 15, and the microcontroller is awakened from sleep mode using wakeup pin 15. Pin 9 is provided as an interrupt pin to measure the time between each compression (which is the closing of a switch). A minimum of two compressions are required to be made before a compression rate may be calculated. After the second compression, the rate will be displayed using the LED's, which is generally the red LED 64a. The LED's which are later illuminated depend on the very last two compressions which are received. When the compressions stop, the microcontroller detects that the rate has fallen out of range or specification, and the red LED 64a is illuminated. If no more compressions are made, the circuit moves to sleep mode and all visual indicators 64 are turned off.

Although the medical training device of the present application has been described in detail sufficient for one of ordinary skill in the art to practice the invention, it should be understood that various changes, substitutions and alterations may be made without departing from the spirit or scope of the device as defined in the attached claims. Moreover, the scope of the present device is not intended to be limited to the specific embodiments described here, which are provided by way of example. As one of ordinary skill in the art will readily appreciate from the disclosure of the present device and its embodiments, other components and means presently existing or later to be developed that perform substantially the same function to achieve substantially the same result as those of the corresponding embodiments described here, may be utilized according to the present application. Accordingly, the appended claims are intended to include within their scope such other components or means.

We claim:

1. An improved medical training device comprising,
   a) a torso portion having a compressible core section and a removable pliable cover section, which core and cover sections are interconnected;
   b) a head portion interconnected with said torso portion, and having a fixed, non-movable, back half section and a movable front half face section which are pivotably interconnected near simulated ear sections;
   c) attachment portions located on said front face section and projecting therefrom for attachment of a lung bag or a face shield; and
   d) a CPR rate indicator, integral with the device, for directly providing real time feed back to a person being trained on said device of the rate of CPR compressions being performed.

2. A training manikin comprising,
   a) a torso portion having a core section comprising a continuous volume filled by a compressible material that is compressed during operation of the manikin, and a removable pliable cover section, each substantially surrounded by a rigid frame member and said core and cover sections are interconnected along one portion of each of said rigid frame members;
   b) a head portion interconnected with said torso portion, and having a non-movable, fixed back half section and a movable front half face section which are pivotably interconnected; and
   c) an integral CPR rate indicator module comprising at least two indicators for providing real time feedback to a student of their rate of CPR compressions during a training exercise and wherein the module includes an automatic power on feature which is prompted to turn the module power to on mode by an initial CPR compression.

3. The training manikin of claim 2 wherein said core and cover sections of said torso portion are interconnected at a pivoting hinge located on one portion of each of said rigid frame members.

4. A training manikin comprising,
   a) a torso portion having a core section comprising a continuous volume filled by a compressible material that is compressed during operation of the manikin, and a removable pliable cover section, each substantially surrounded by a rigid frame member and said core and cover sections are interconnected along one portion of each of said rigid frame members;
   b) a pivotable head portion interconnected with said torso portion; and
   c) an integral CPR rate indicator module comprising at least two indicators for providing real time feedback to a student of their rate of CPR compressions during a training exercise, and wherein the module includes an automatic power on feature which is prompted to turn the module power to on mode by an initial CPR compression.

5. The training manikin of claim 4 with the CPR rate indicator module further comprising three different indicators for providing real time feedback of CPR compression rates.

6. The training manikin of claim 4 or 5 wherein the CPR rate indicator module indicators are visual indicators or audio indicators.

7. The training manikin of claim 6 wherein the CPR rate indicator module visual indicators are colored red, yellow and/or green lights.

8. An improved medical training device comprising,
   a) a torso portion having a compressible core section and a removable pliable cover section, which core and cover sections are interconnected;
   b) a head portion interconnected with said torso portion, and having a fixed, non-movable, back half section and a movable front half face section which are pivotably interconnected near simulated ear sections;
   c) attachment portions located on said front face section and projecting therefrom for attachment of a lung bag or a face shield; and
   d) a CPR rate indicator module integral with the device having at least two indicators for directly providing real time feed back to a person being trained on said device of the rate of CPR compressions being performed during a training exercise, and the indicator module includes an automatic on feature which is prompted to the on mode by a CPR compression.

9. An improved medical training device comprising,
   a) a torso portion having a compressible core section and a removable pliable cover section, which core and cover sections are interconnected;
   b) a head portion interconnected with said torso portion, and having a fixed, non-movable, back half section and a movable front half face section which are pivotably interconnected near simulated ear sections;
   c) attachment portions located on said front face section and projecting therefrom for attachment of a lung bag or a face shield; and
   d) a CPR rate indicator, integral with the device, for directly providing real time feed back to a person being trained on said device of the rate of CPR compressions being performed, with the CPR rate indicator being positioned for viewing during performance of CPR compressions through a window formed in the device.

10. An improved medical training device comprising,
    a) a torso portion having a compressible core section and a removable pliable cover section, which core and cover sections are interconnected;
    b) a head portion interconnected with said torso portion, and having a fixed, non-movable, back half section and a movable front half face section which are pivotably interconnected near simulated ear sections;
    c) attachment portions located on said front face section and projecting therefrom for attachment of a lung bag or a face shield; and
    d) a CPR rate indicator, integral with the device, for directly providing real time feed back to a person being trained on said device of the rate of CPR compressions being performed, with the CPR rate indicator positioned for viewing during performance of CPR compressions through an opening formed in the removable pliable cover section of the torso portion of the device.

* * * * *